United States Patent [19]

Thompson et al.

[11] Patent Number: 5,396,647
[45] Date of Patent: Mar. 7, 1995

[54] GPS BASE WIDE AREA COMMUNICATION SYSTEM SITE SELECTION

[75] Inventors: Michael J. Thompson, Davie; Dana J. Salihi, Lauderhill; M. Mansour Ghomeshi, Ft. Lauderdale, all of Fla.

[73] Assignee: Motorola, Inc., Schaumburg, Ill.

[21] Appl. No.: 172,667

[22] Filed: Dec. 22, 1993

Related U.S. Application Data

[63] Continuation of Ser. No. 970,899, Nov. 3, 1992, abandoned.

[51] Int. Cl.⁶ .......................... H04B 7/26; H04B 7/19; H04Q 7/02; H04Q 9/02
[52] U.S. Cl. ............................ 455/33.2; 455/33.4; 455/54.1; 455/56.1; 455/62; 379/60; 342/357
[58] Field of Search ............... 455/12.1, 13.1, 33.1, 455/33.2, 33.4, 34.1, 34.2, 54.1, 54.2, 56.1, 62, 67.1; 379/59, 60; 342/357

[56] References Cited

U.S. PATENT DOCUMENTS

| | | | |
|---|---|---|---|
| 5,043,736 | 8/1991 | Darnell et al. | 342/357 |
| 5,093,926 | 3/1992 | Sasuta | 455/56.1 |
| 5,095,500 | 3/1992 | Tayloe et al. | 379/59 |
| 5,128,959 | 7/1992 | Bruckert | 455/33.2 |
| 5,129,098 | 7/1992 | McGirr et al. | 455/67.1 |

OTHER PUBLICATIONS

Motorola Manual "MTS 2000 TM SMARTNET TM Portable radios", pp. 103–106, Sep. 1992.

Primary Examiner—Edward F. Urban
Assistant Examiner—Mark D. Wisler
Attorney, Agent, or Firm—M. Mansour Ghomeshi

[57] ABSTRACT

A communication device (200) operates in a wide area communication system having a number of sites. The communication device (200) includes a first receiver for receiving communication signals from an active site (120). The information received from the active site (120) includes the location information and the quality of the adjacent sites (102, 104, 106, and 108). The communication device (200) includes a GPS receiver (210) for establishing its own location. The location of adjacent sites along with their quality is ranked to produce a ranking table. A controller (208) is utilized to sense when the signal strength of the communication signals received from the active site (120) falls below a desired level. The communication device (200) switches to a new site on top of the ranking list when this condition of low signal strength is present.

19 Claims, 3 Drawing Sheets

5,396,647

GPS BASE WIDE AREA COMMUNICATION SYSTEM SITE SELECTION

This is a continuation of application Ser. No. 07/970,899, filed on Nov. 3, 1992, and now abandoned.

FIELD OF THE INVENTION

This invention is generally related to communication systems and more particularly to wide area communication systems.

BACKGROUND OF THE INVENTION

In wide area communication systems, a number of sites are used to provide wide area coverage for the communication devices operating in that system. A challenge in wide area communication systems is the identification of the optimum site by the communication devices. In some systems, this problem has been addressed by having each site identify adjacent sites, and each subscriber radio periodically measure signal strength on adjacent sites to identify the site with the stronger signal. This method renders the subscriber radio unable to accomplish normal control channel data processing while measuring adjacent channel signal strength. In other words, the time that should be spent on receiving voice or data is partially spent on locating an optimum channel to communicate on. This could result in delays in unmuting of the audio circuits, delays in transmission, and even missed events. In addition to this, the system requires very complex software to manage the adjacent site ranking process. The complexity of the software is aggravated with the addition of new sites and new subscribers. Yet another problem with these systems is that signal strength received from adjacent sites may not tell the entire story of the position of the site. It is known that the signal strength of signals is impacted by fading and multipath in similar conditions. So, it can be seen, that although an optimal site may be determined using signal strength, that site may not be the most optimum one because of the interfering fading or multipath conditions which are temporary. It is therefore, appreciated that a method of identifying an optimum site in a wide area communication system is highly desired that would overcome the deficiencies of the prior art.

SUMMARY OF THE INVENTION

Briefly in accordance with the present invention, a communication device operates in a wide area communication system having a plurality of sites. The communication device includes a first receiver for receiving communication signals from an active site, which is the present site the communication device is operating in. The information received from the active site includes the location information and the quality of the adjacent sites. The communication device includes means for establishing its own location and means for ranking the adjacent sites to produce a ranking list. A sensor is utilized to sense when the signal strength of the communication signals received from the active site falls below a desired level. In addition, the communication device has the ability to switch to a new site on top of the ranking list when this condition of low signal strength is present.

DETAILED DESCRIPTION OF THE PREFERRED EMBODIMENT

A radio operating in a wide area communication system needs to be continuously updated on the strongest channels in the area. This is so that it could switch to a strong channel when the strength of its present channel falls below a certain strength. Having the information as to which is the next optimum channel before the need for switch exists is highly valuable. This prevents on spot search, which may result in loss of valuable information at a critical time. The knowledge of the most optimum site would allow a radio to instantly transfer its communication to the new site rather than having to first locate the adjacent sites. This invention provides a system where the radio is continuously updated on the location of the next most optimum site without even needing to transfer to that site.

In the preferred embodiment of the present invention, a communication device includes a Global Positioning System (GPS) receiver in order to receive location coordinates for determining its location. The location of adjacent sites and the active site are periodically transmitted by the active site to the communication device. The quality of the adjacent sites and the active site is also transmitted periodically from the active site to the communication device. These three factors; the location of sites; the location of the communication device; and the quality of sites are processed to generate a list of the most optimum sites surrounding the communication device.

Figure 1:
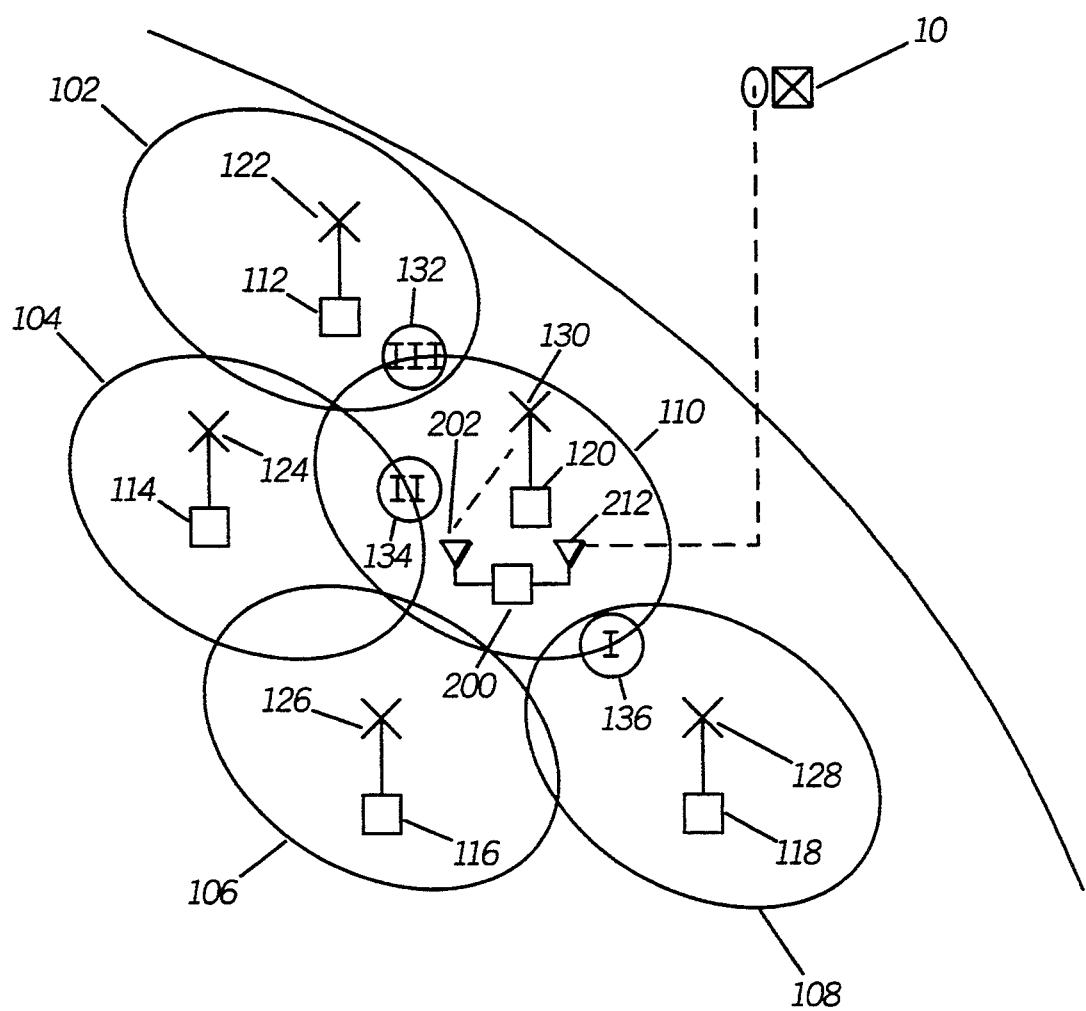
FIG. 1 shows, the coverage areas of various communication sites in the communication system in accordance with the present invention.

The principle of the present invention are made clearer by referring to the drawings and particularly to FIG. 1 where the coverage area of the communication system having a plurality of sites is shown. In this embodiment, five sites are shown each employing a base station, 112, 114, 116, 118, and 120 and an associated antenna 122, 124, 126, 128, and 130, respectively. The coverage area associated with each site is shown by zones 102, 104, 106, 108, and 110. A communication device 200 is shown located in zone 110 and communicating with the site 120. This site is the active site as shown in this FIG. The communication device 200 includes a GPS antenna 212 and a regular antenna 202. The GPS antenna 212 receives GPS information from a satellite 10. The GPS information received by the communication device 200 is interpreted to determine the location of the communication device 200. The use of GPS signals in GPS receivers is well known in the art. Such receivers are commercially available. As the communication device 200 roams in the zone 110, the base station 120 periodically transmits information with regard to the location and quality of the adjacent sites 112, 114, 116, and 118 and the active site 120 to the communication device 200. The quality of the adjacent sites is communicated via a quality factor. This quality factor transmitted from the base station 120 to the communication device 200 includes such information as transmit power, radius of coverage, coverage map, areas having fading problems, direction of coverage. The coverage map is a chart or map of the site signal strength, versus location at various discrete points. The quality factor along with the location information of the adjacent sites are received by the communication device 200. The communication device 200 proceeds to rank the adjacent sites based on the information it received from the active site 120. One method of doing this is to combine the location information and the quality factor of each adjacent site to produce a single qualifier. The ranking list includes all the adjacent sites including the active site so that the communication device 200 could pick the site on the top of the ranking list when site change is deemed necessary. When the signal strength of the signals communicated between the communication device 200 and the base station 120 falls below a desired level, the communication device 200 refers to its ranking list and picks up the site on the top. Depending on the site, the communication device 200 then switches to the frequency of the highest ranked site and continues operation without interruption. It is noted, that it is no longer necessary for the communication device 200 to evaluate the signal strength of various sites as it is roaming around in an area. Hence valuable time is not spent evaluating signal strength, rather it is spent in conducting communication activity.

As mentioned, the information transmitted from the active site 120 to the communication device 200 include location and quality information on adjacent and active sites. The location information of the adjacent site is transmitted in the form of latitude and longitude. For presentation purposes, it is assumed that the location of the adjacent sites 112, 114, 116, and 118 and the three randomly selected spots 132, 134, and 136 is as shown below. This table also includes the location information of the active site and the communication device.

| LOCATION | LATITUDE | LONGITUDE |
| --- | --- | --- |
| Site 120 | 100 | 100 |
| Site 112 | 50 | 200 |
| Site 114 | 0 | 120 |
| Site 116 | 30 | 25 |
| Site 118 | 150 | 0 |
| Spot 132 | 90 | 160 |
| Spot 134 | 70 | 105 |
| Spot 136 | 140 | 50 |
| Communication Device 200 | 120 | 80 |

Location calculation techniques using latitude and longitude are well known in the art. Using any of well known techniques, the location of the communication device 200 and its distance from any of the sites can be calculated. The calculated distance along with the quality factor is then combined to produce a number representing the overall quality of each of the adjacent sites including the active site. These numbers are then placed in a ranking list. This list is continuously updated to reflect the most optimum sites at each instant of time. Therefore, as the communication device 200 moves around and approaches different points in zone 110, the top of the list is all it has to look at when a site change over is necessary. To better demonstrate the principles of the present invention, the ranking list is formulated for three different spots 132, 134, and 136. Using the latitude and longitude information of table 1 and the formula for determining the distance between two points, the following table can be created.

| | Distance from: | | | | |
| --- | --- | --- | --- | --- | --- |
| | Site 120 | Site 112 | Site 114 | Site 116 | Site 118 |
| Car Comm. Device | 85 | 120 | 126 | 105 | 85 |
| Spot 136 | 64 | 175 | 156 | 113 | 51 |
| Spot 134 | 30 | 97 | 72 | 89 | 132 |
| Spot 132 | 61 | 57 | 98 | 148 | 171 |

With this information available, the ranking can be readily done. At the location of the communication device 200, the ranking of the sites is as follows:
Site 120
Site 118
Site 116
Site 114
Site 112
The site ranking at spot 136 would be
site 118
site 130
site 116
site 114
site 112
The site ranking at spot 134 would be
site 120
site 114
site 116
site 112
site 118
The site ranking at spot 132 would be
site 112
site 120
site 114
site 116
site 118

It is once again noted that these ranking lists are prepared without taking into account the quality factors which are periodically received from the active site.

Note that the altitude of the active and adjacent sites may be transmitted along with the latitude and longitude to account for the curvature of the earth. In addition, the altitude may be used to indicate the height of the antenna used at a particular site.

Figure 2:
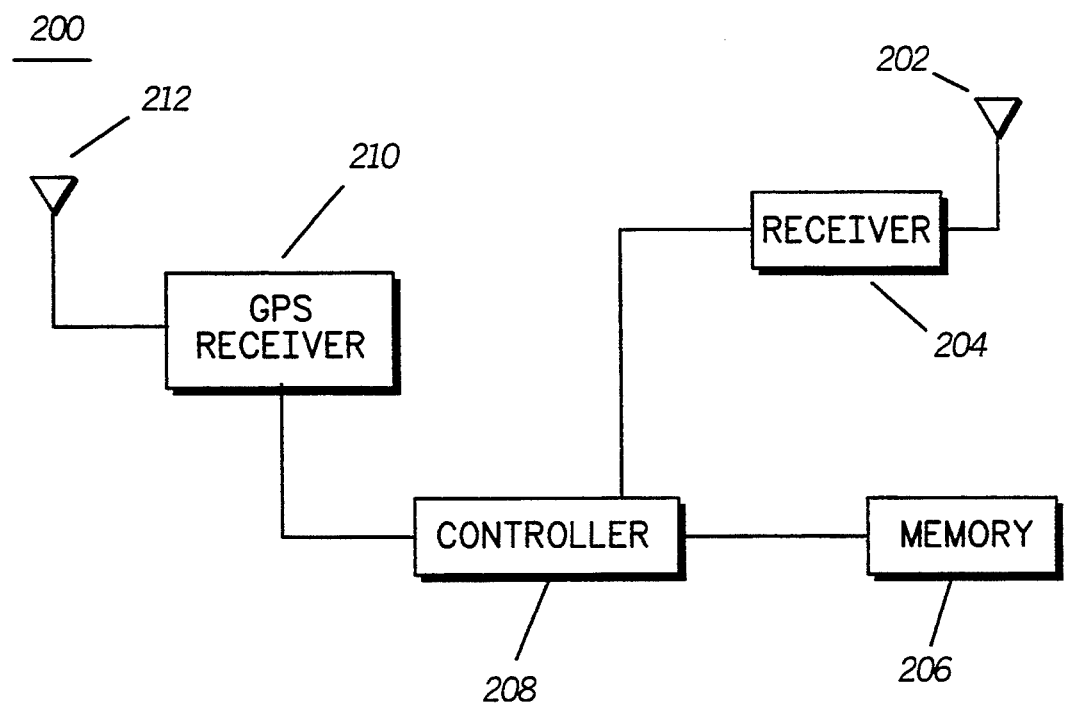
FIG. 2 shows, a block diagram of the communication device in accordance with the present invention.

Referring to FIG. 2, a block diagram of the communication device 200 is shown in accordance with the present invention. The GPS antenna 212 is coupled to a GPS receiver 210 which is controlled via a controller 208. The receiver antenna 202 is coupled to a receiver 204 which is also controlled via the controller 208. A memory block 206 is used for storing the information received by the receiver 204 and for other memory purposes. The controller 208, provides the mechanism by which the location and quality information are stored in the memory 206. Once all the information has been stored, they are retrieved by the controller 208 and processed to produce the ranking list. This ranking list is once again stored in the memory 206. In the preferred embodiment, the receiver 204 is used to sense the signal strength of the received signal. The controller 208 is used to evaluate the signal strength of signals communicating between the active site and the communication device 200.

Figure 3:
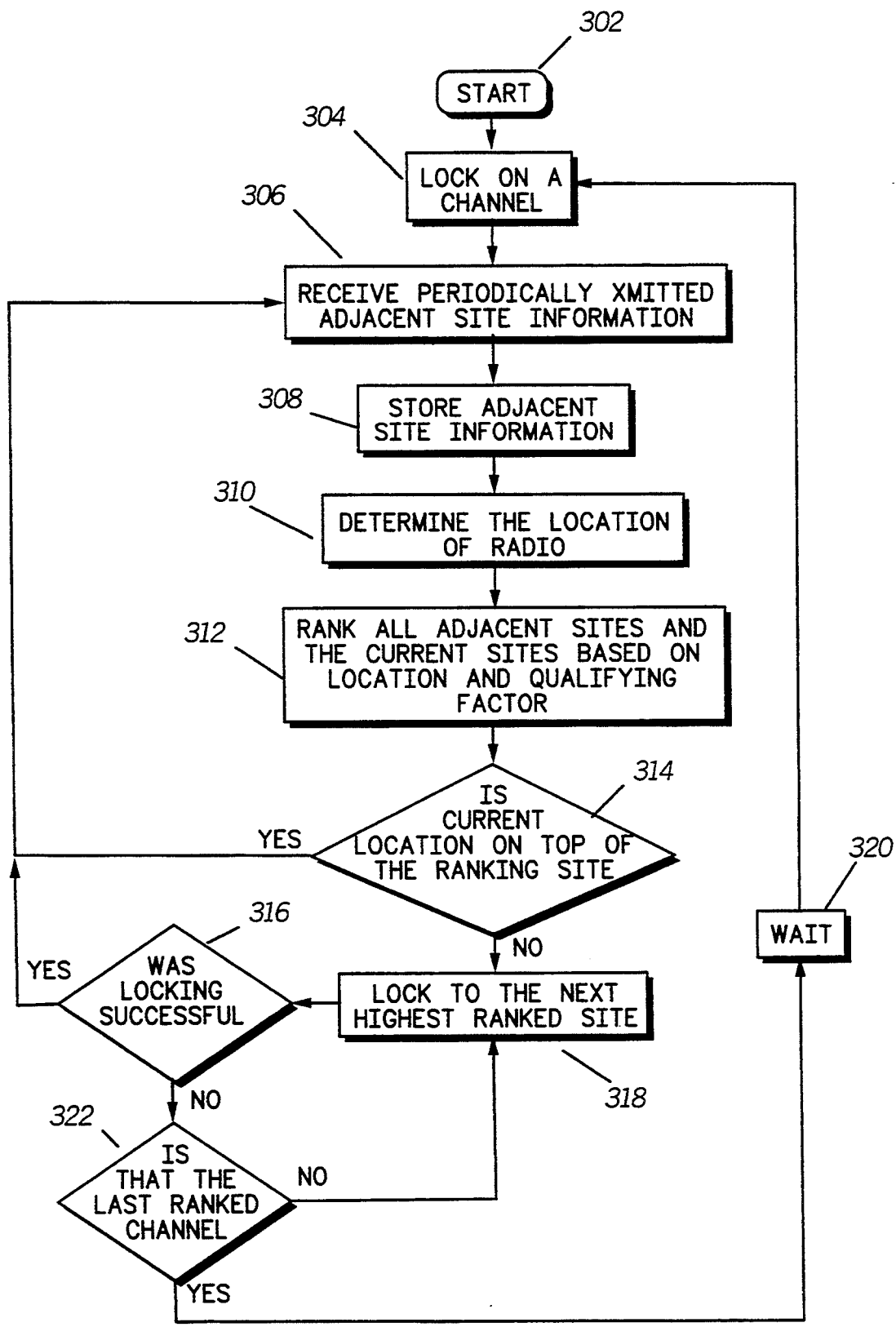
FIG. 3 shows a flow diagram of the operation of the communication device in accordance with the present invention.

Referring to FIG. 3, a flow diagram of the operation of the communication device 200 in accordance with the principles of the present invention is shown. From a start block 302, the operation is coupled to block 304 where the communication device 200 locks on a channel, communicating. The locking on the channel is equivalent to operating with an active site. Once locked on a channel, the communication device 200 periodically receives information on the adjacent and active sites from the active site, block 306. The site information is then stored in the memory 206 via a controller 208, block 308. At this point, the operation concentrates on determining the location of the communication device 200, block 310. This operation requires the use of the GPS receiver in receiving GPS information. The controller 208, then processes the location of the communication device 200, the location of adjacent sites, and the qualifying factors of adjacent sites to produce a ranking list, block 312. Following the generation of the ranking list, a condition block determines whether the current location (active site) is on top of the ranking list. The YES output of this condition block returns the operation to block 306 where adjacent site information is periodically received. The NO output indicating that a more optimum site is present is coupled to block 318 where the communication device 200 locks to the next highest ranked site. From block 318, a second condition block 316 determines whether the locking on the new channel was successful. The YES output, once again, returns the operation to block 306 where adjacent site information is periodically received. It is noted that with this block the active site has now changed to the new site. The NO output of the condition block 316 is coupled to yet a third condition block 322 where a decision is made as to whether the channel or the site that the communication device 200 is attempting to lock ON is the last on the ranking list. The NO output indicating that the channel attempting to be logged on is not the last ranked channel, returns the operation to block 318 where the communication device 200 locks on the next highest ranked site. The YES output, on the other hand, is coupled to a wait block 320 which allows the radio communication device 200 to wait for a predetermined period of time. The output of this wait is coupled to block 304 where the communication device 200 locks on a new channel. It is noted that block 322 is utilized for situations where the signal strength of no site is acceptable for the communication device 200 to lock on. This may be encountered in severe fading conditions or in areas where coverage is not provided.

In summary, a communication system is described having a number of communication sites. A communication device operating in this communication system utilizes a method as described by the present invention to locate the most optimum adjacent site when operating in an active site. This method gathers information on the location of the communication device and adjacent sites; the location of the communication device is determined using GPS technology. The location of the adjacent sites is transmitted periodically by the active site. Also transmitted from the active site is information on the quality of the adjacent and the active sites. The location information, quality information and the location of the communication device are then processed and ranked to produce a ranking list with the most optimum site including the active site on the top. This ranking list is frequently updated as the communication device roams in a wide area. Each instant of time has a ranking list with the most optimum site on the top. As the signal strength of the signals communicated between the communication device and the active site diminish to undesirable levels, the communication device can switch to a site on top of the ranking list without having to measure the signal strength of the adjacent sites. The updating of the ranking list takes significantly shorter times that would otherwise be necessary to measure the signal strength of adjacent sites.

It has been demonstrated that by establishing a ranking list based on the quality and location of adjacent sites, the communication device can rapidly select and switch to a new site without having to spend valuable time in evaluating each site when the signal strength of the active site falls below a desired level. Furthermore, the time the communication device spends in establishing the ranking list is determined by the characteristics of the communication device. Indeed, the most significant parameter in setting this time in the processing speed of the communication device, the communication device can update its ranking list when it is not handling important information. A significant aspect of the present invention is that the signal strength is used to trigger a switch over. All the necessary site evaluation is done independent of the signal strength levels. This is a significant advantage over the prior art methods where the signal strengths of the active site falling below a desired level triggered activities leading to the evaluation of other sites.

What is claimed is:

1. In a communication device operating in a communication system having a plurality of communication sites geographically located to provide communication coverage for a plurality of communication devices, a method for selecting an optimum communication site comprising the steps of:
   receiving adjacent site location information from a single active site;
   receiving coordinate information on the location of the communication device;
   ranking the adjacent sites based on the location coordinate information received from the single active site and the location of the communication device to produce a ranking list;
   measuring signal strength of signals communicated between the single active site and the communication device and sensing when they fall below a desired level;
   selecting the site on top of the ranking list; and
   switching to the selected site and communicating using the selected site.

2. The method of claim 1, further including the step of receiving a site quality factor on the adjacent site from the active site.

3. The method of claim 2, wherein the step of ranking includes ranking the adjacent sites including the single active site.

4. The method of claim 2, wherein the step of ranking includes ranking the adjacent sites based on the location coordinate information and the quality factor to produce the ranking list.

5. The method of claim 1, wherein the step of receiving coordinate information on the location of the communication device includes receiving location coordinate information from a global positioning system (GPS).

6. The method of claim 1, wherein the step of ranking includes ranking the adjacent sites including the single active site.

7. A communication device operating in a wide area communication system having a plurality of sites, the communication device comprising:
- a first receiver for receiving information from a single active site including a quality factor and coordinate information on the quality and location, respectively, of sites adjacent to the active site;
- a second receiver for establishing the location of the communication device;
- means responsive to first and second receivers for ranking the adjacent sites to produce a ranking list;
- means for measuring signals strength;
- means for sensing when signal strength of the communication signals received from the single active site falls below a desired level;
- means for switching to a new site on top of the ranking list in response to the means for sensing; and
- means for communicating with the new site.

8. The communication device of claim 7, wherein the information on the quality of adjacent sites includes information on the antenna height.

9. The communication device of claim 7, wherein the second receiver includes a GPS receiver.

10. The communication device of claim 7, wherein the means for measuring includes a signal strength indicator.

11. The communication device of claim 7, wherein the means for ranking includes ranking the active site along with adjacent sites in one ranking list.

12. The communication device of claim 7, wherein the first receiver includes a trunked receiver.

13. In a communication system having a plurality of communication devices and a plurality of communication sites for providing wide area communication coverage for the plurality of communication devices, at least one of the plurality of communication devices comprising:
- a first receiver for receiving radio frequency signals from a single active communication site, the radio frequency signals include coordinate information on the location and a quality factor of adjacent communication sites;
- a second receiver for receiving coordinate information on the location of the communication device;
- means coupled to the first receiver for storing the location and the quality factor of the adjacent communication sites to produce stored information;
- means for ranking the adjacent communication sites using the stored information to produce a ranking list;
- means for measuring signal strength levels;
- means for sensing when signal strength level of radio frequency signals received by the first receiver is below a pre-determined value; and
- means for switching to a communication site on top of the ranking list.

14. The communication device of claim 13, wherein the second receiver includes a GPS receiver.

15. The communication device of claim 13, wherein the information on the quality includes antenna height information.

16. The communication device of claim 13, wherein the information on the quality includes antenna gain information.

17. The communication device of claim 13, wherein the information on the quality includes a factor representing the terrain of the communication site.

18. The communication device of claim 13, wherein the information on the quality includes a factor representing the receiver sensitivity of the communication site.

19. The communication device of claim 13, wherein the information on the quality includes a factor representing fading conditions associated with the communication site.

* * * * *